(12) United States Patent
Lin et al.

(10) Patent No.: US 8,421,290 B2
(45) Date of Patent: Apr. 16, 2013

(54) ASSEMBLY OF DRIVING DEVICE FOR BRUSHLESS MOTOR OF AIR-CONDITIONER

(75) Inventors: Chin-Hui Lin, Taichung (TW); Jin Lee, Fengyuan Township, Changhua County (TW)

(73) Assignee: Headline Electric Co., Ltd., Nan Tou Hsien (TW)

( * ) Notice: Subject to any disclaimer, the term of this patent is extended or adjusted under 35 U.S.C. 154(b) by 209 days.

(21) Appl. No.: 13/117,120

(22) Filed: May 26, 2011

(65) Prior Publication Data

US 2012/0299423 A1  Nov. 29, 2012

(51) Int. Cl.
*H02K 5/00* (2006.01)

(52) U.S. Cl.
USPC .............................................. 310/91; 310/89

(58) Field of Classification Search .................... 310/88, 310/89, 91
See application file for complete search history.

(56) References Cited

U.S. PATENT DOCUMENTS

| | | | | |
|---|---|---|---|---|
| 2,253,405 A | * | 8/1941 | Veinott | 310/166 |
| 4,116,410 A | * | 9/1978 | Boyd et al. | 248/581 |
| 4,726,112 A | * | 2/1988 | King et al. | 29/596 |
| 6,229,236 B1 | * | 5/2001 | Fisher et al. | 310/89 |
| 6,906,440 B1 | * | 6/2005 | Fife | 310/91 |
| 7,812,491 B2 | * | 10/2010 | Katada et al. | 310/89 |
| 7,872,386 B2 | * | 1/2011 | Lee | 310/89 |
| 8,222,783 B2 | * | 7/2012 | Umehara et al. | 310/81 |

\* cited by examiner

*Primary Examiner* — Nguyen N Hanh
(74) *Attorney, Agent, or Firm* — Leong C. Lei

(57) ABSTRACT

The present invention relates to an improved assembly of driving device for brushless motor of air-conditioner, which is a design providing a unitary and simple assembly of driving device of brushless motor, including a brushless motor body and a support rack. The support rack is made in the form of a U-shape having opposite ends forming end plates that extend high upwards. Besides providing a recess for positioning, assembling, and fixing the motor body, the U-shaped support rack forms a space that exactly accommodates the driving device therein, whereby the structure of the motor is reduced in volume and the purposes of use of simplified structure and practical convenience are realized.

4 Claims, 2 Drawing Sheets

_US 8,421,290 B2_

ASSEMBLY OF DRIVING DEVICE FOR BRUSHLESS MOTOR OF AIR-CONDITIONER

TECHNICAL FIELD OF THE INVENTION

The present invention generally relates to an improvement of assembly of driving device for brushless motor of air conditioner, which provides a simplified structural arrangement of unitary assembly of brushless motor and driving device.

DESCRIPTION OF THE PRIOR ART

Due to the need for control of driving, a conventional brushless motor is structured by including a driving device. For the conventional assembly of brushless motor structure that are currently used, the driving device that is provided for the purposes of control of driving is of such an assembly arrangement as being externally mounted. In other words, the driving device, as well as wiring thereof, is manufactured separately and installed at an outer side of a brushless motor housing as an additionally attached assembly. Thus, the assembling is done through being supported by and mounted to projecting support rack at opposite ends of a body of conventional brushless motor. Based on the direction along which a motor spindle extends, at one outside surface opposite to where the motor spindle extends, a proper mounting box structure is provided to mount the whole assembly of the driving device together with the previously included wiring to a suitable location outside the support rack, and connection wiring is connected to predetermined connection site that is previously formed in the motor body to realize mutual connection for control of driving. However, for such a conventional assembly of driving control, when the motor shows an arrangement where the motor spindle extends outward from both ends, due to the extension of the spindle in both ends for transmission of power, there is no proper location to mount the driving device, whereby it becomes impossible to realize mounting to an outside surface of the motor in a proper and location-fixed manner and mounting can only be done at a location on a machine chassis on which assembling is to be made or the ground with wire connection therewith and then connection with wires is made. Since the driving device is an important device that controls the rotation of the brushless motor, being not fixedly coupled to the brushless motor makes wiring complicated and also leads to waste and inconvenience for use of spatial arrangement for assembly, and may even causes certain concerns about severe influence of overall operation safety. It is desired to improve the conventional brushless motor structure in order to provide an improved arrangement for assembling the operation driving device of brushless motor to show such an arrangement for use as being closest to an integrated construction with the motor and thus improve the practicability thereof.

SUMMARY OF THE INVENTION

In view of the inconvenience of use found in practical use and assembling of the conventional brushless motor, the present invention aims to provide an assembly of driving device for brushless motor of air-conditioner, which comprises a design where a support rack for assembling a brushless motor is made in the form of a high-raised U-shaped support, whereby the U-shape provides an internal space that receives a driving device to be mounted therein and thus an integrated assembly for driving control of brushless motor is realized to effectively the numerous drawbacks of inconvenient mounting and poor use found in the use of the conventionally externally attached driving device.

The primary objective of the present invention is to make a support rack for assembling a brushless motor in the form of a high-raised U-shaped design, wherein a driving device is received and mounted in a recessed internal space of the U-shape to thereby achieve the purposes of simplifying structure, sound assembling, and being practical and safe.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
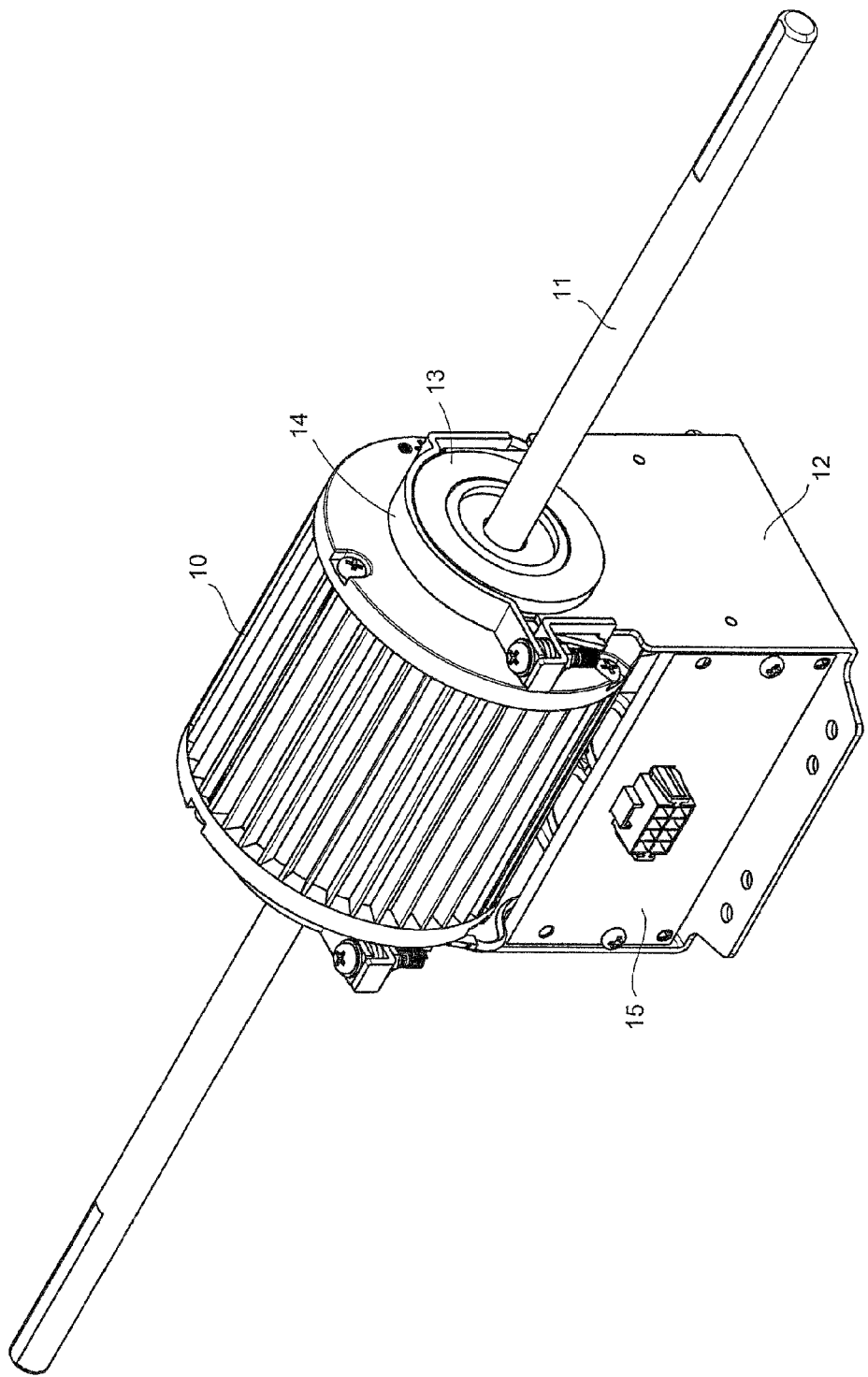
FIG. 1 is a perspective view showing an assembly of driving device for brushless motor according to the present invention.
Figure 2:
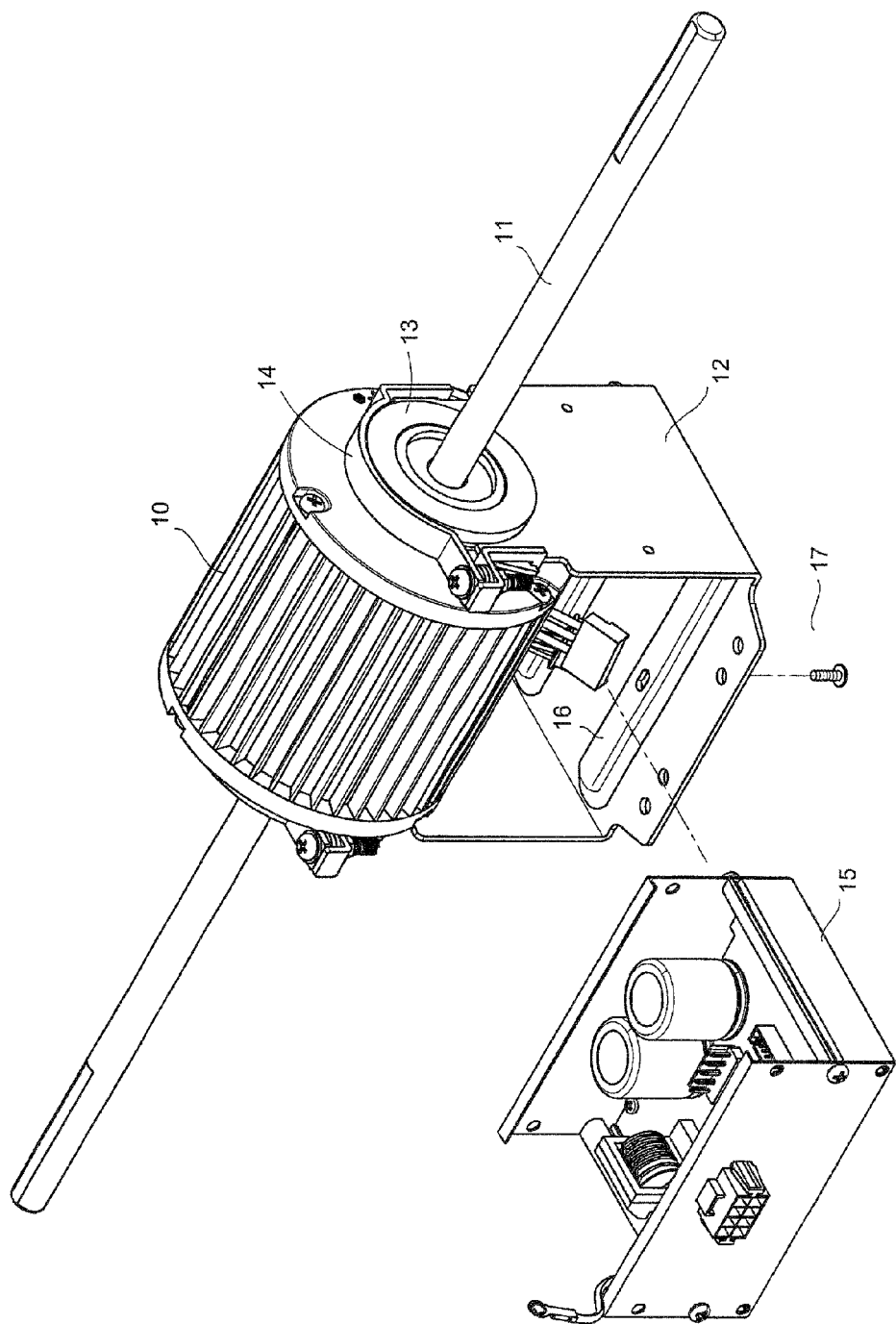
FIG. 2 is an exploded view showing the assembly of driving device for brushless motor according to the present invention.

The present invention provides an improved assembly of driving device for brushless motor of air-conditioner, which is an improved design of simplified assembling and use for motor driving device, of which the improved arrangement is illustrated in FIGS. 1 and 2. The whole structure comprises a motor body 10 that is subjected to control of rotation and has one end or opposite ends from which a motor spindle 11 projects outward for transmission of power. The whole motor body 10 has a bottom where a U-shaped support rack 12 is provided. Based on the height that opposite end plates of the rack upward extend, a top of each plate is recessed at a central portion thereof to form a mounting slot for receiving and positioning a spindle seat 13 to which an anti-vibration ring based shock dampening device is fit at each of opposite ends of the motor body 10. Covering and fixing is made by a securing plate 14 that shows a corresponding curved configuration housing a top side of a body of the anti-vibration ring to thereby securely support and position the assembly of the whole motor body 10. The U-shape 12 forms a recessed internal space through the high-raised configuration within which a driving device 15 to which wiring is properly assembled is directly accommodated. To securely assemble and position the whole driving device 15, the U-shape support rack 12 forms, in a bottom thereof, spaced, raised ribs 16 that are previously formed by stamping so as to elevate, to a proper extent, the driving device 15 for assembling and providing ventilation at the bottom to eliminate the potential risk of excess heat generation in the control of rotation. The raised ribs 16 also help bottom side assembling of fixation bolts 17 that extend inward from the outer side of the bottom of the rack to fix the driving device 15, so that the whole driving device 15 and the support rack 12 can be firmly secured together as a unitary assembly. The bolts 17 have heads that are just received in the recessed space formed under the bottom of the raised ribs 16 without undue outward projection leading to unevenness. As such, wiring for transmission and control of the motor body 10 can be fit to a connection site of the driving device 15 with the shortest distance to provide a practical advantage of safety and simplification of the connection wiring for rotation control of the brushless motor and thus the purposes of simplifying assembling and use of the motor and reducing the are realized.

Based on the design of the present invention, the support rack 12 for supporting and assembling the brushless motor body 10 is made in the form of a U-shape rack having opposite ends that are raised upward to a proper height to make the brushless motor body 10 assembled in a high-raised fashion at a proper height with a space formed in the bottom of the raised configuration. A driving device 15 that is provide with previously arranged wiring is accommodated the high-raised space of the U-shape. Based on the properly raised configuration of the raised bottom ribs 16, the driving device 15 can be assembled in an open and ventilating fashion to ensure secure and safety of use and assembling. Further, with the raised configuration of the raised ribs 16, bolts 17 are allowed to directly insert from the bottom of the U-shaped rack, according to the locations of openings previously formed in a raised plate portion of each raised rib 16, to secure the bottom plate of the driving device 15 thereby forming a unitary fixed assembly structure between the whole driving device 15 and the brushless motor body 10, realizing a structural arrangement that makes assembling and use of the brushless motor safe and convenient. Thus, a simplified and unitary structural arrangement is made, which is completely independent of one spindle or dual spindle output transmission of the motor, whereby the structure of the brushless motor is simple and safe. Such a novel, simple and practical structural arrangement is a complete innovated design of a product of this category.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. An assembly of driving device for brushless motor of air-conditioner, comprising a brushless motor body, and a support rack for supporting and assembling and a driving device for driving, characterized in that the brushless motor body support rack is made in the form of a U-shaped rack having opposite ends forming upward-extending end plates each of which has a top that is recessed to form a mounting slot for receiving and positioning a spindle seat at each of opposite ends of the motor body, the U-shaped rack forming a recessed internal space for accommodating the driving device that is directly set in the space, whereby a unitary assembly of the driving device and the motor is realized to ensure that connection wiring for rotation control assembling is shortest and to achieve practical purposes of covering, safety, and simplification.

2. The assembly of driving device for brushless motor of air-conditioner according to claim 1, wherein the U-shaped rack forms spaced raised ribs on a bottom.

3. The assembly of driving device for brushless motor of air-conditioner according to claim 1, wherein the support rack is firmly secured to the driving device as a unitary assembly through engagement of bolts arranged at a bottom thereof.

4. The assembly of driving device for brushless motor of air-conditioner according to claim 1, wherein a securing plat that shows a corresponding curved configuration is set to house and fix a top side of a spindle seat arranged at each of opposite ends of the motor body.

* * * * *